(12) United States Patent
Ryu

(10) Patent No.: US 11,674,728 B2
(45) Date of Patent: Jun. 13, 2023

(54) COMPRESSOR DRIVING APPARATUS AND REFRIGERATOR INCLUDING THE SAME

(71) Applicant: LG Electronics Inc., Seoul (KR)

(72) Inventor: Nayi Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 804 days.

(21) Appl. No.: 16/603,123

(22) PCT Filed: Apr. 4, 2018

(86) PCT No.: PCT/KR2018/003991
§ 371 (c)(1),
(2) Date: Oct. 4, 2019

(87) PCT Pub. No.: WO2018/186686
PCT Pub. Date: Oct. 11, 2018

(65) Prior Publication Data
US 2021/0108844 A1   Apr. 15, 2021

(30) Foreign Application Priority Data

Apr. 4, 2017   (KR) .................. 10-2017-0043855

(51) Int. Cl.
*F25B 1/02*   (2006.01)
*F25B 49/02*  (2006.01)
(Continued)

(52) U.S. Cl.
CPC .......... *F25B 49/022* (2013.01); *F04B 35/045* (2013.01); *F04B 49/12* (2013.01);
(Continued)

(58) Field of Classification Search
CPC .. F25B 1/02; F25B 2400/073; F25B 2700/06; F25B 2700/151; F04B 2201/0201
See application file for complete search history.

(56) References Cited

U.S. PATENT DOCUMENTS

| 6,753,665 B2   | 6/2004 | Ueda et al. |
| 2003/0099550 A1 | 5/2003 | Kim |

(Continued)

FOREIGN PATENT DOCUMENTS

| CN | 105241172 | 1/2016 |
| JP | H08247025 | 9/1996 |

(Continued)

OTHER PUBLICATIONS

EP Extended European Search Report in European Appln. No. 18781879.3, dated Mar. 9, 2021, 7 pages.

(Continued)

*Primary Examiner* — Jerry-Daryl Fletcher
*Assistant Examiner* — Daniel C Comings
(74) *Attorney, Agent, or Firm* — Fish & Richardson P.C.

(57) ABSTRACT

Described are a compressor driving apparatus and a refrigerator including the same. The compressor driving apparatus includes: switching elements; an inverter; an output current detector for detecting an output current flowing through a motor; and an inverter controller for controlling the inverter. The inverter controller controls the piston so that one end of the piston is fixed at a first position spaced apart from the discharge unit at stroke of the piston during a first period, controls the piston to collide with the discharge unit when a change rate in an operation rate or a position error of the compressor is equal to or greater than a predetermined value, and controls the piston so that the one end of the piston is fixed at a second position spaced apart from the discharge unit at stroke of the piston during a second period after the collision of the piston.

13 Claims, 17 Drawing Sheets

(51) Int. Cl.
    *F04B 49/12* (2006.01)
    *F04B 35/04* (2006.01)
(52) U.S. Cl.
    CPC .......... *F25B 1/02* (2013.01); *F25B 2400/073* (2013.01); *F25B 2500/12* (2013.01); *F25B 2500/19* (2013.01); *F25B 2600/021* (2013.01); *F25B 2600/024* (2013.01); *F25B 2700/06* (2013.01)

(56) References Cited

U.S. PATENT DOCUMENTS

2003/0213256 A1    11/2003  Ueda et al.
2015/0176579 A1*   6/2015  Lim ..................... F25B 31/023
                                                               417/45

FOREIGN PATENT DOCUMENTS

| KR | 100162454 | 7/1997 | | |
|---|---|---|---|---|
| KR | 1020060011058 | 2/2006 | | |
| KR | 1020120137899 | 12/2012 | | |
| KR | 1020160063880 | 6/2016 | | |
| KR | 20170108928 A | * | 9/2017 | .............. F04B 35/04 |

OTHER PUBLICATIONS

Korean Office Action in Korean Appln. No. 10-2017-0043855, dated Nov. 1, 2020, 11 pages (with English translation).
PCT International Search Report in International Appln. No., PCT/KR2018/003991, dated Aug. 10, 2018, 3 pages.

* cited by examiner

[Figure 1]
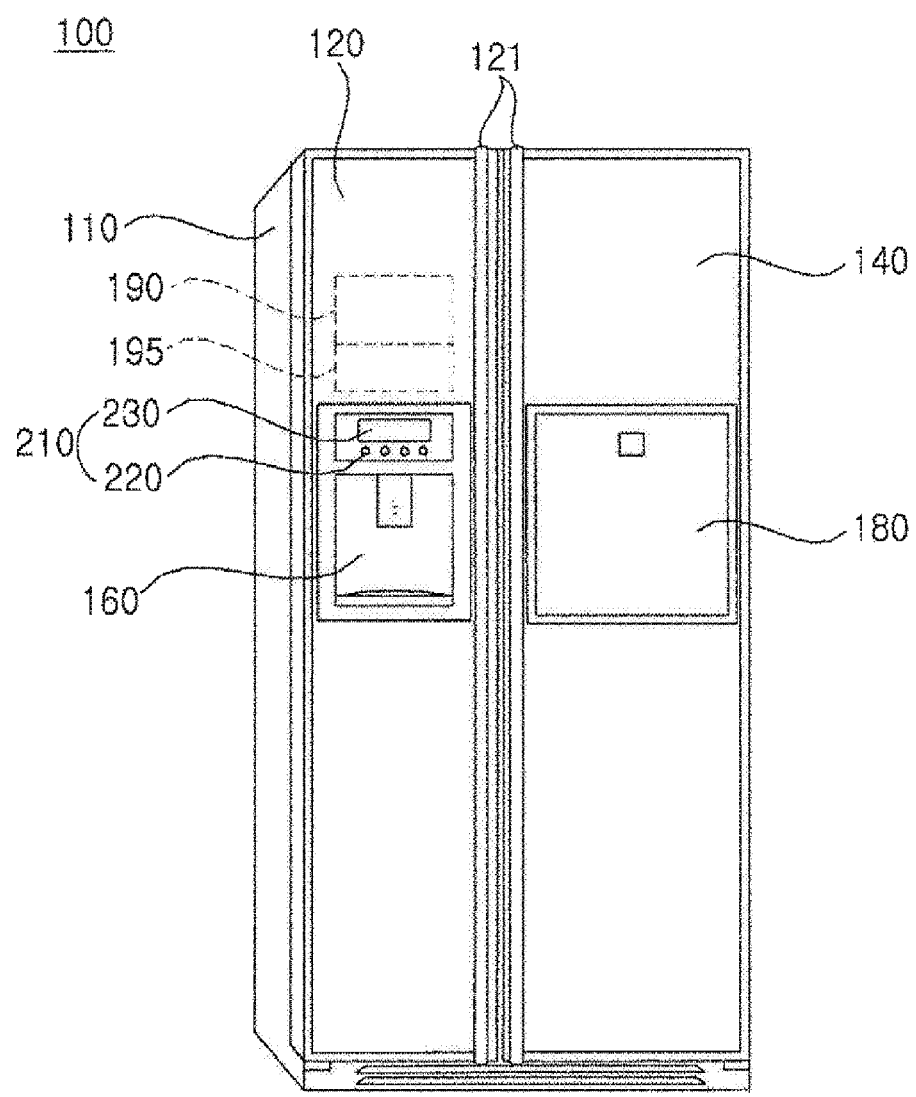

[Figure 2]
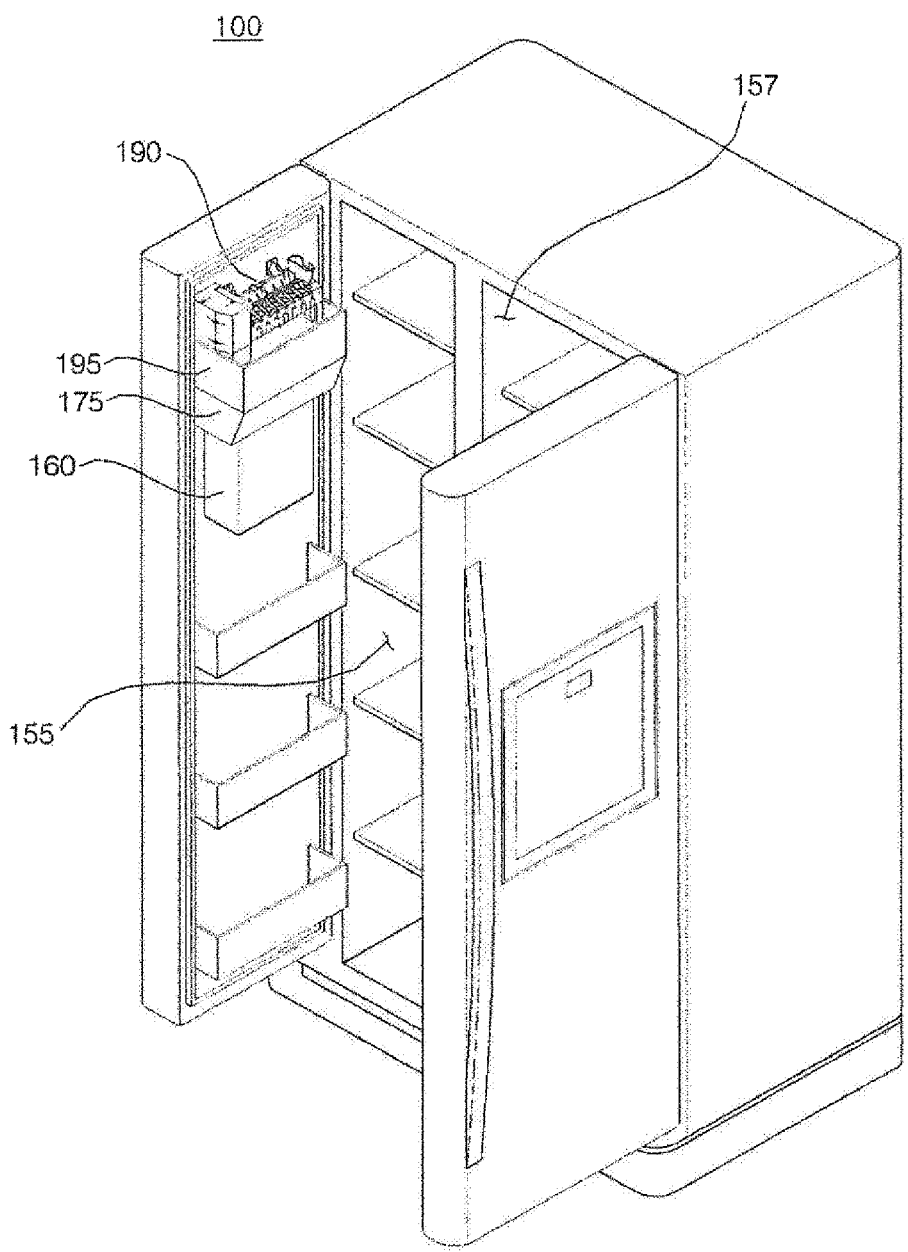

[Figure 3]
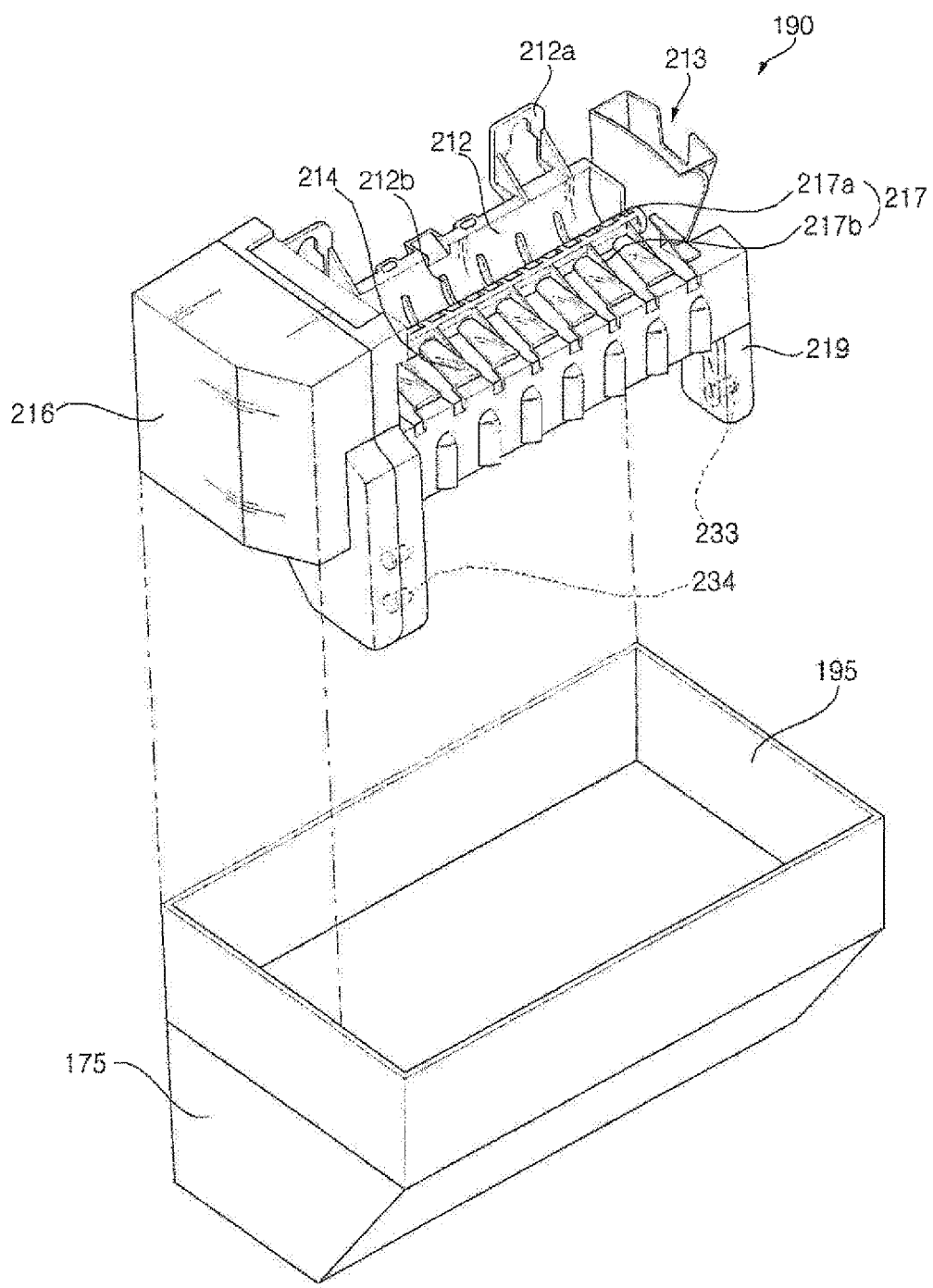

[Figure 4]
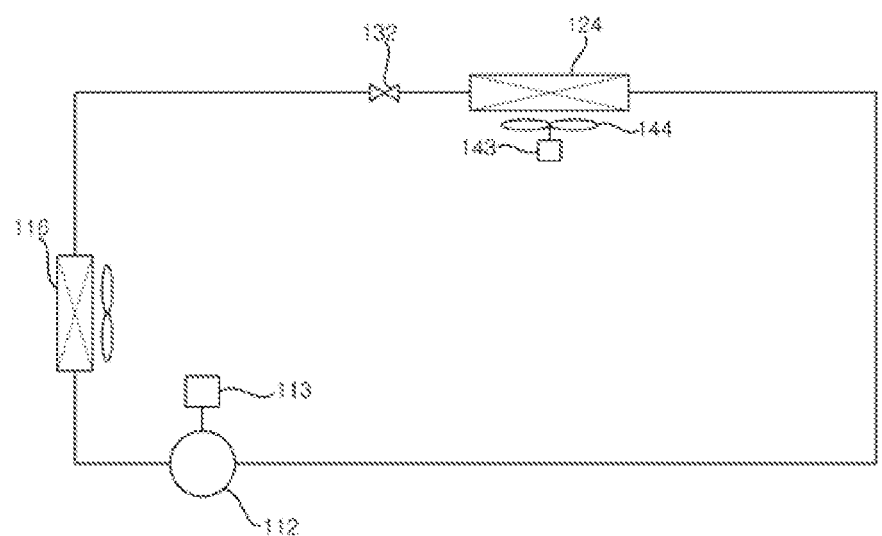

[Figure 5]
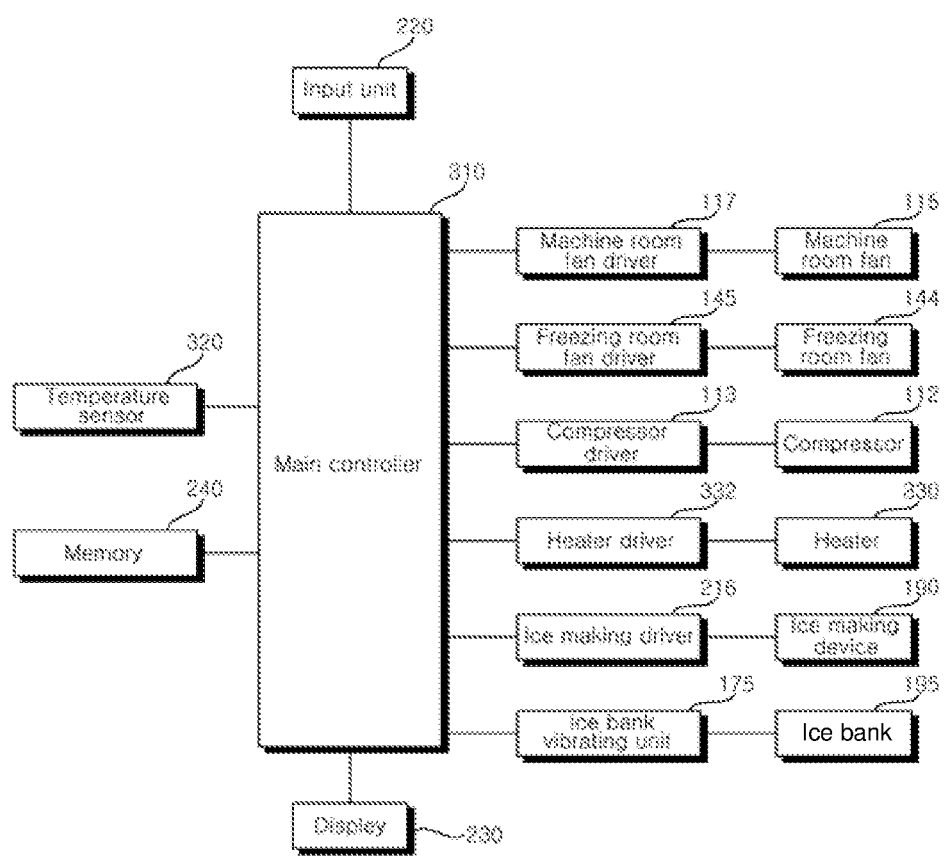

[Figure 6]
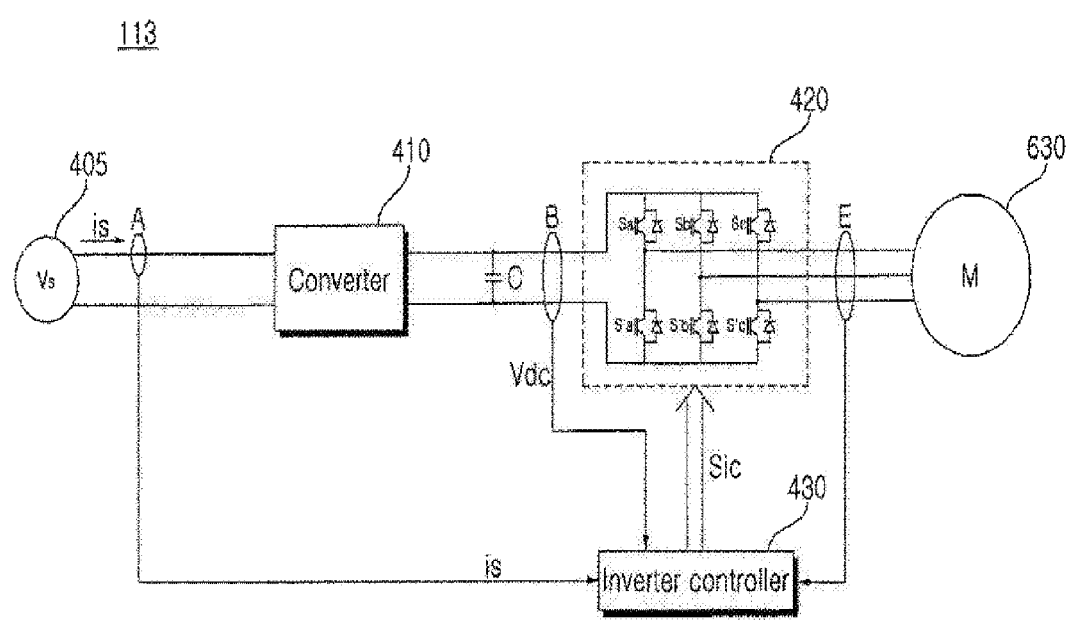

[Figure 7]
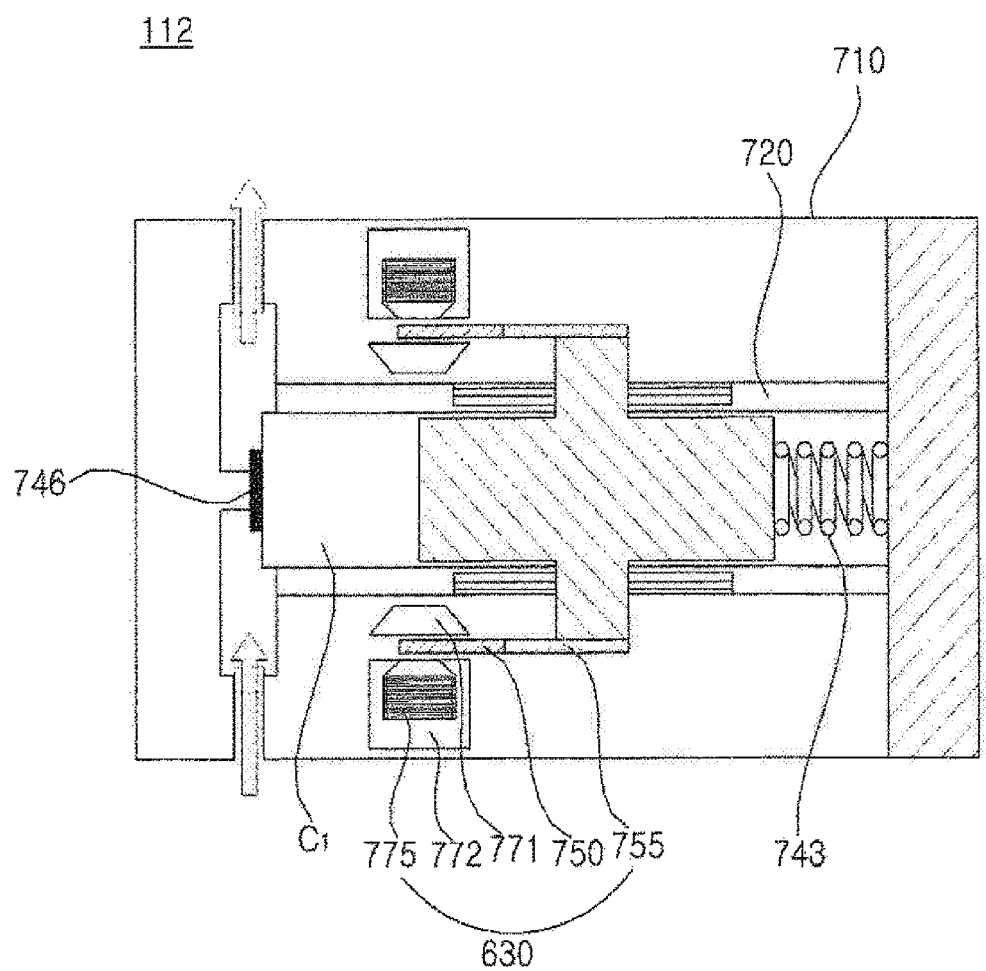

[Figure 8]
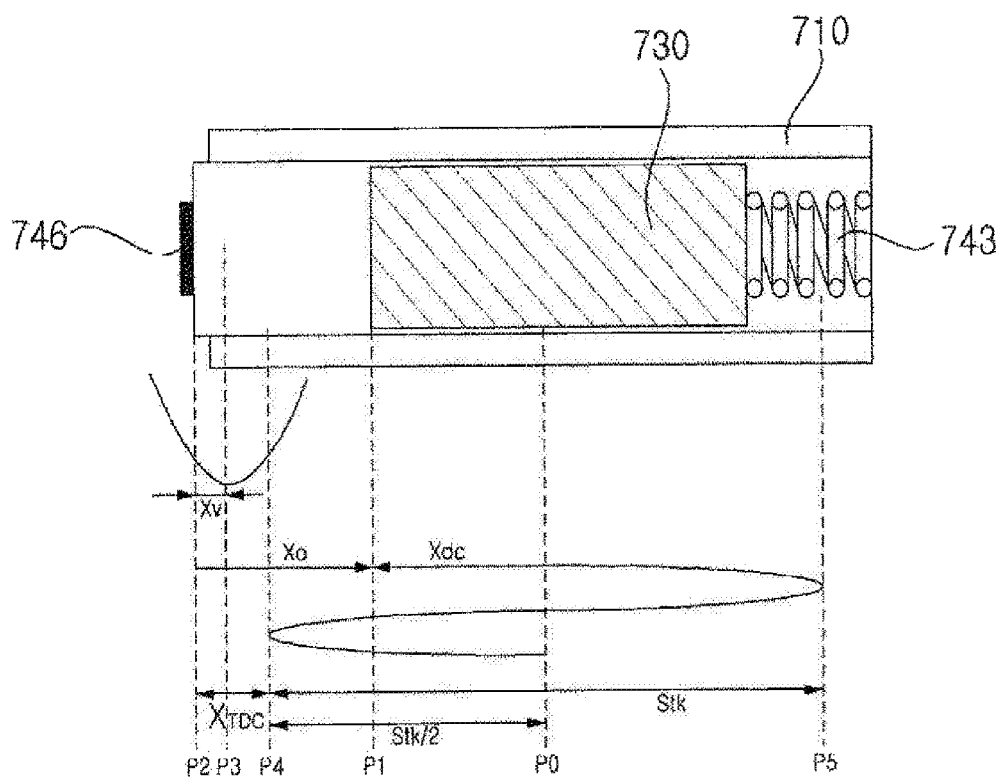

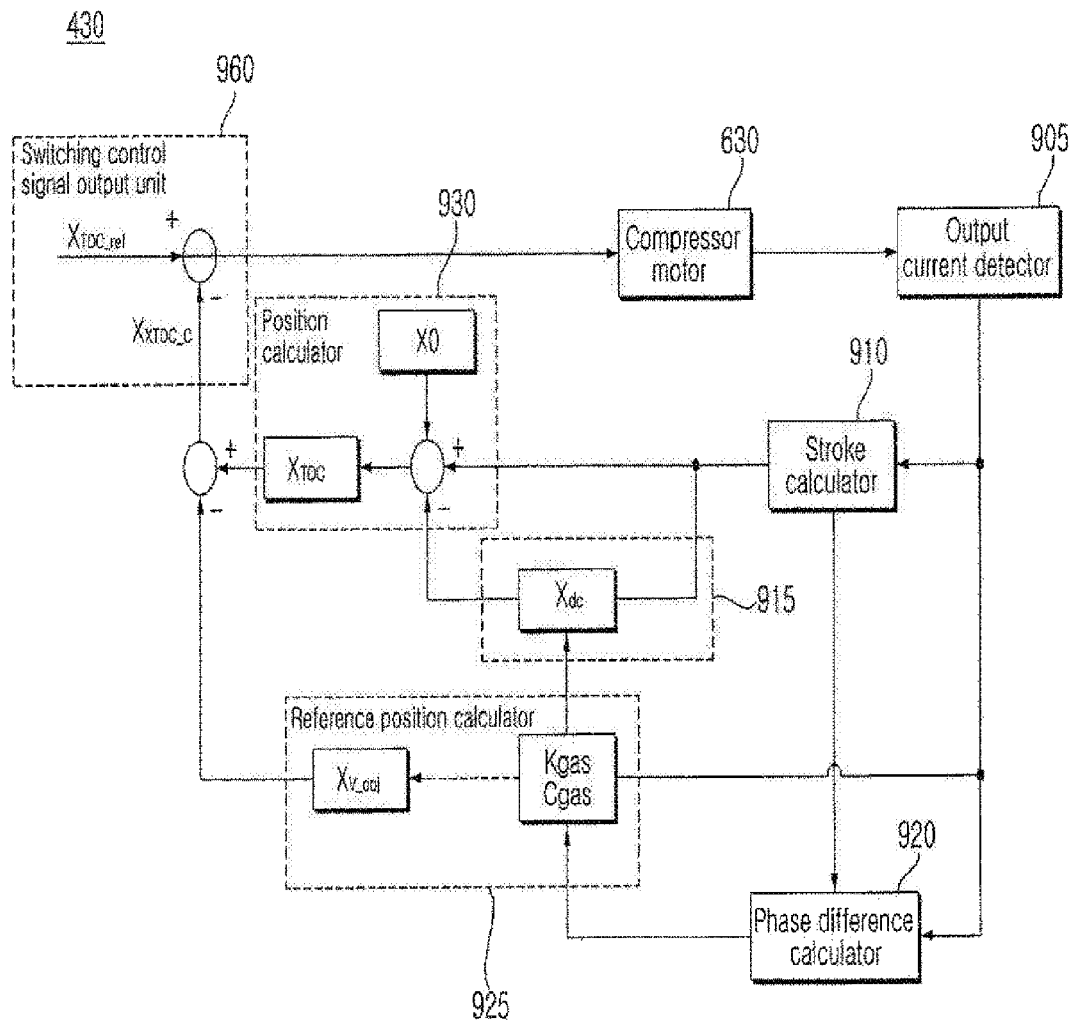
[Figure 9]

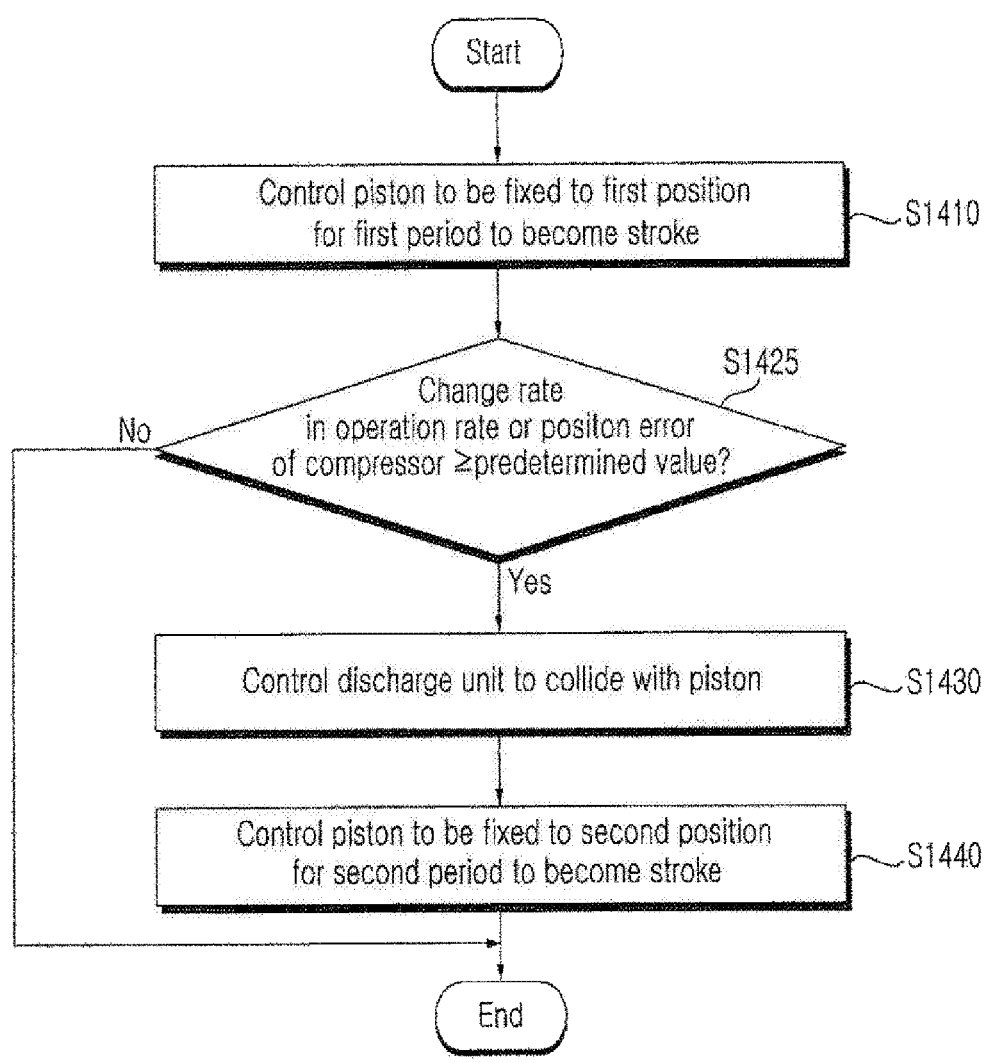
[Figure 10]

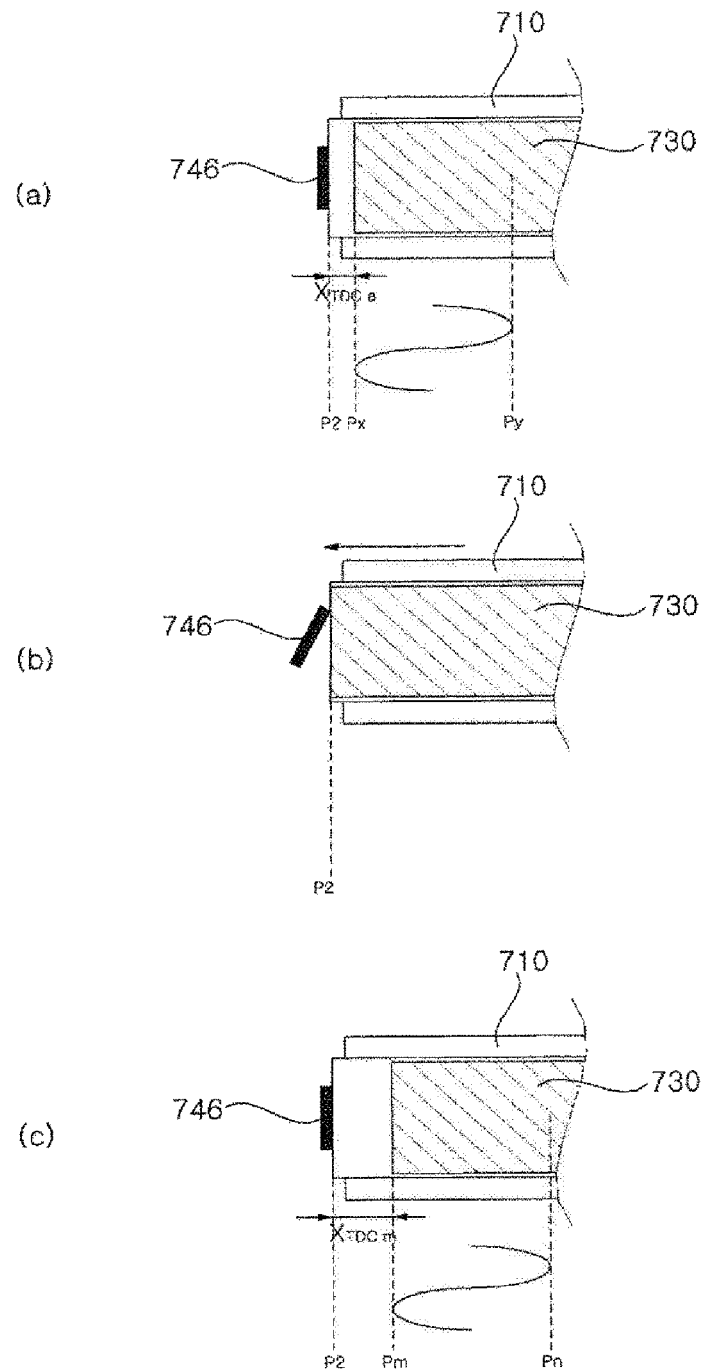
[Figure 11]

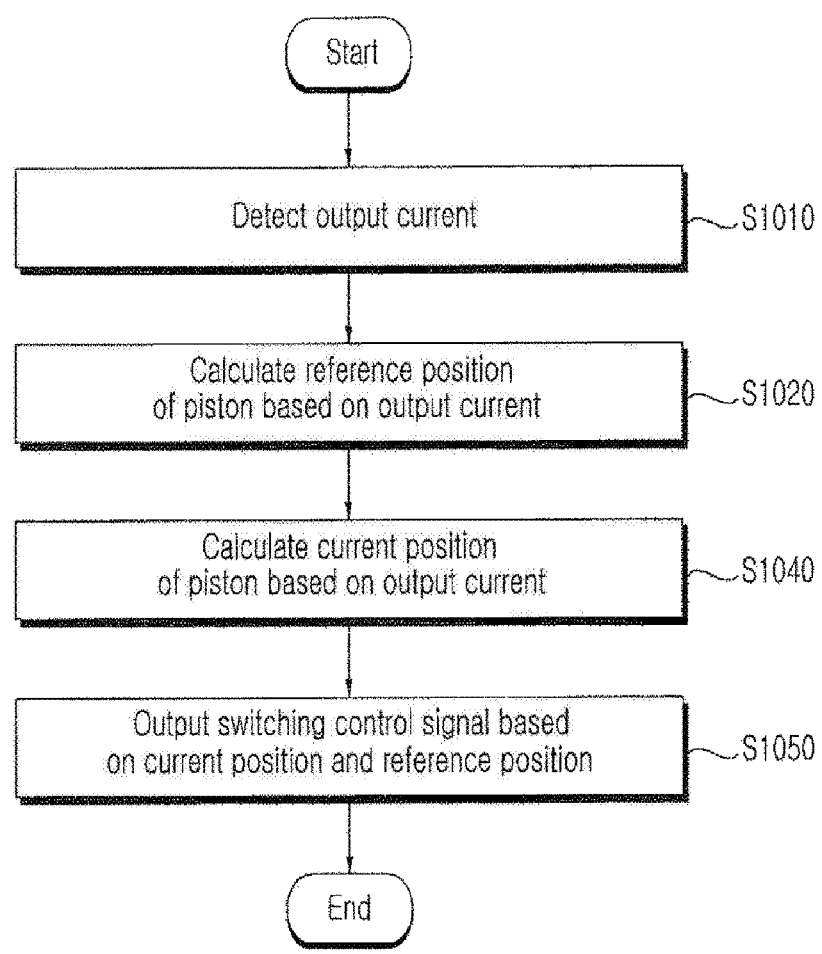
[Figure 12]

[Figure 13]
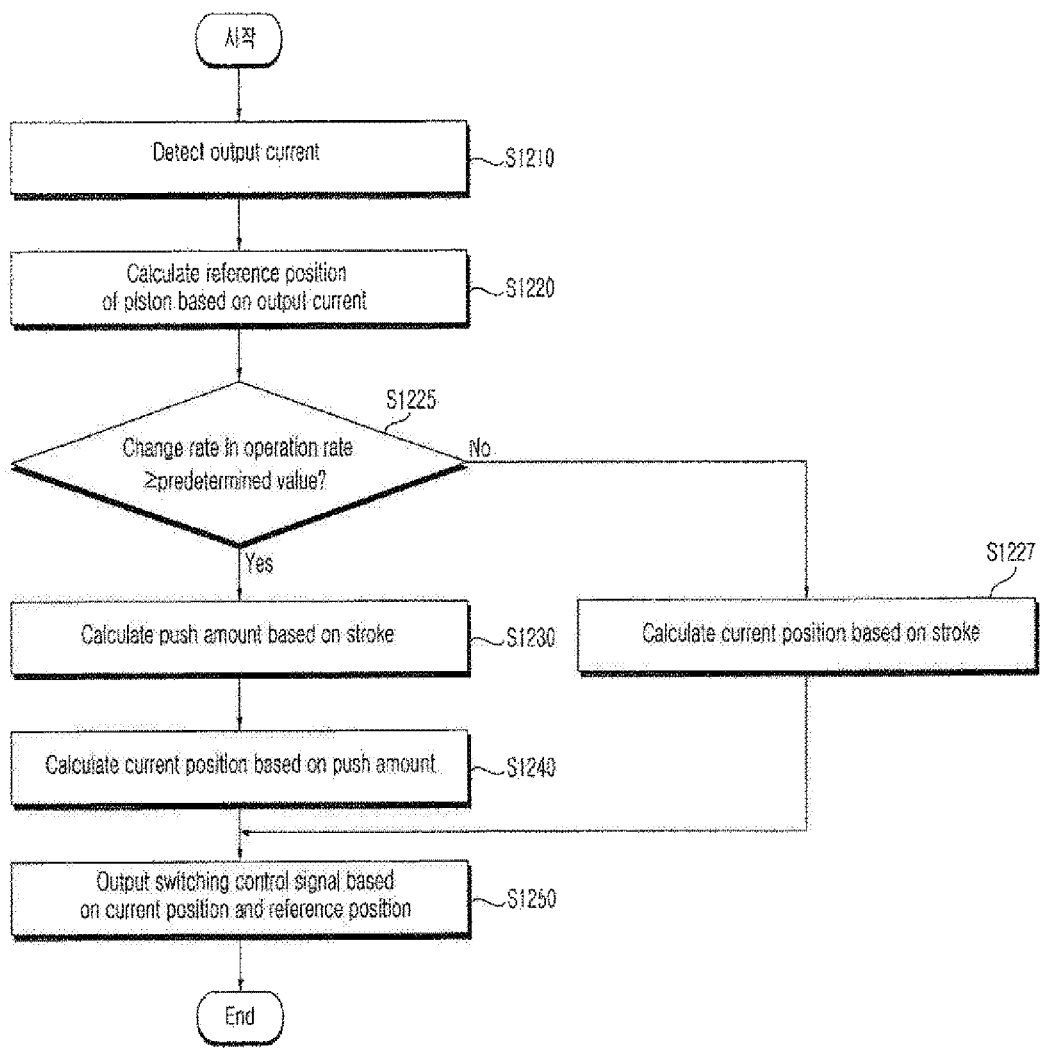

[Figure 14a]
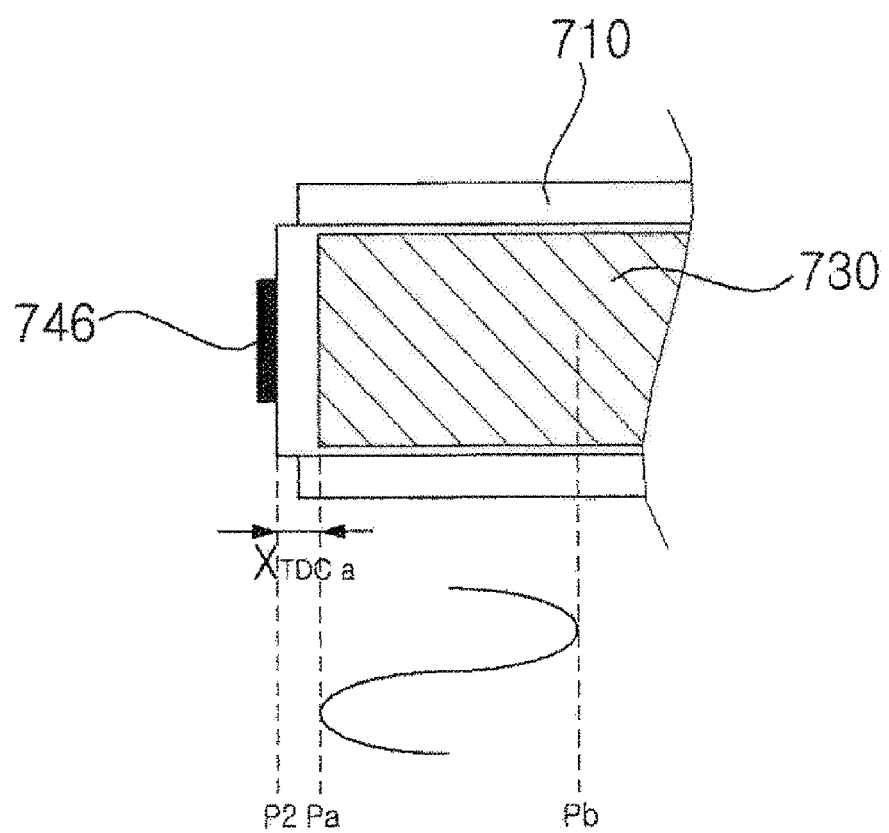

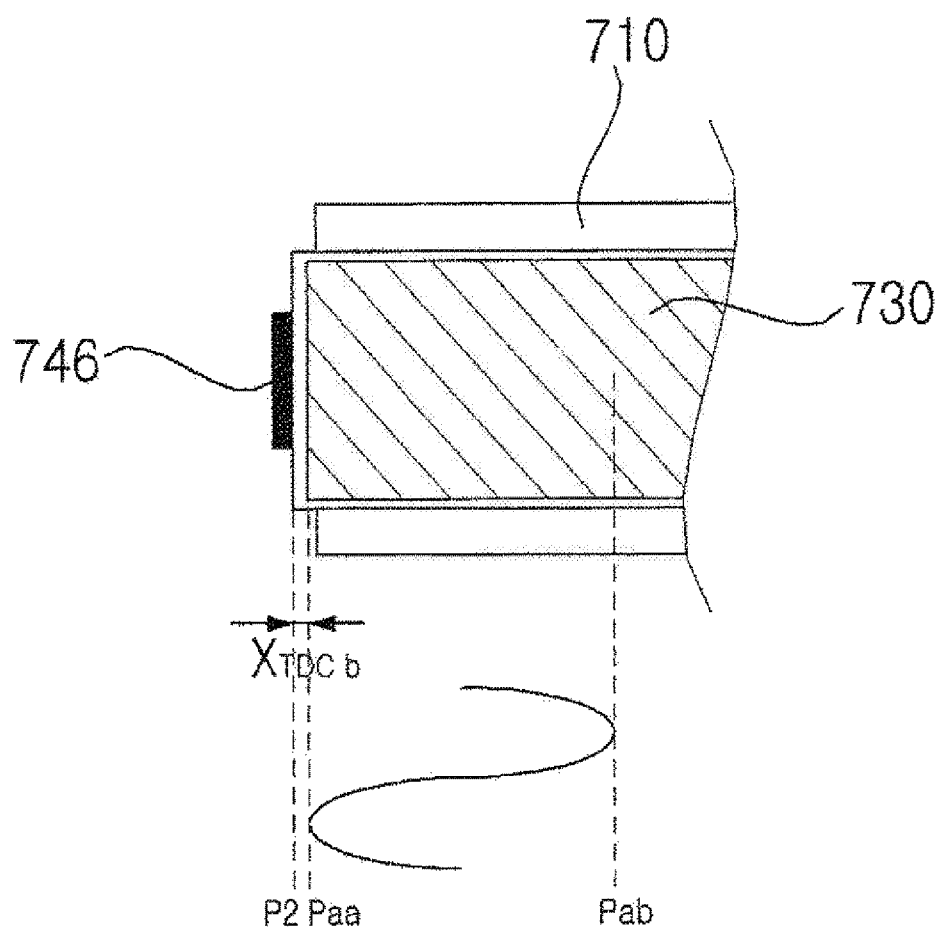
[Figure 14b]

[Figure 15a]
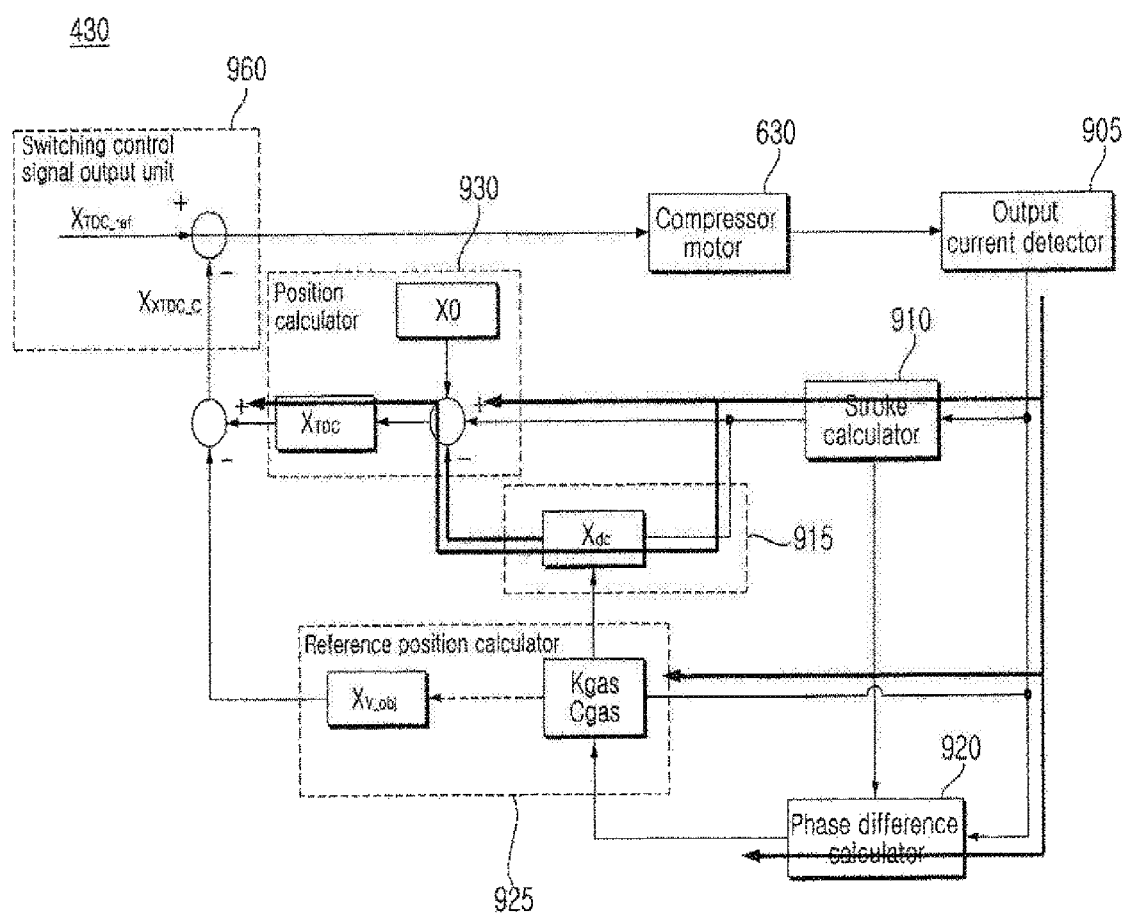

[Figure 15b]
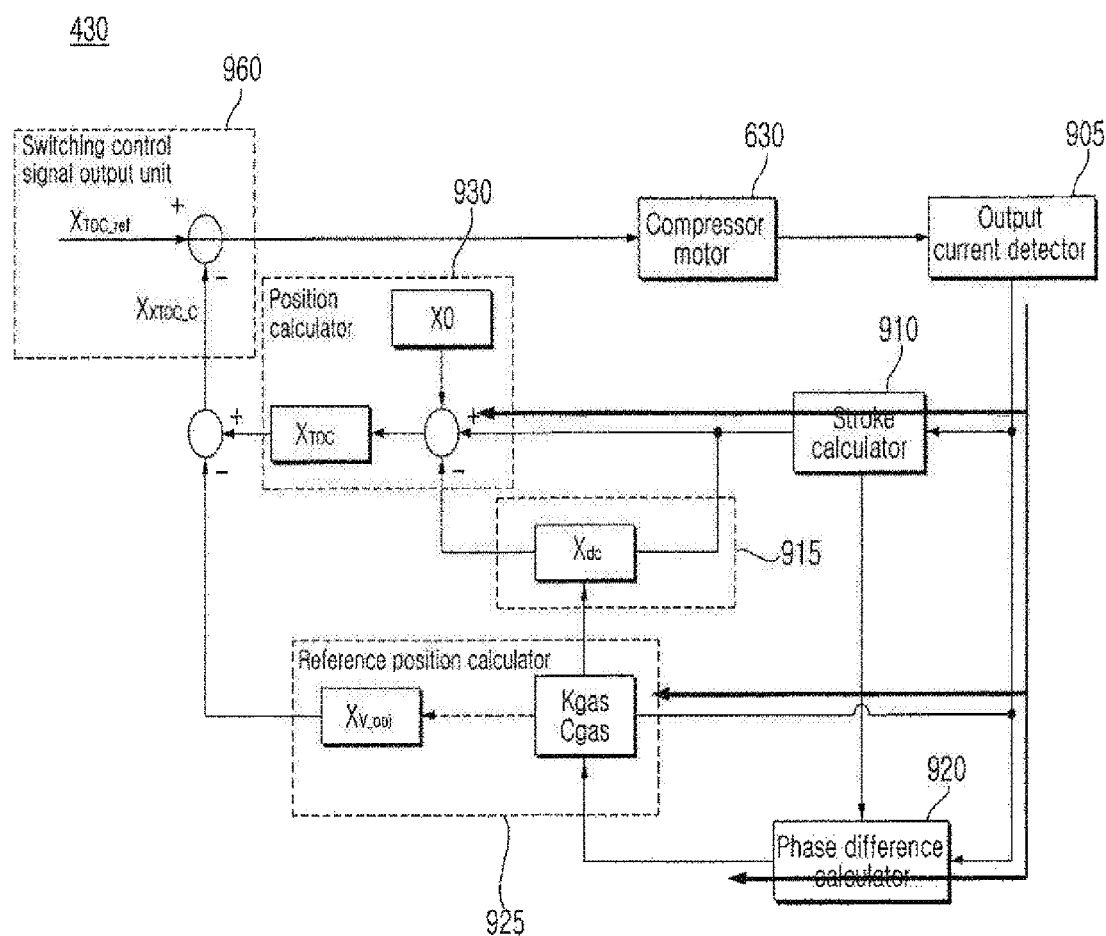

COMPRESSOR DRIVING APPARATUS AND REFRIGERATOR INCLUDING THE SAME

CROSS-REFERENCE TO RELATED APPLICATIONS

This application is the National Stage filing under 35 U.S.C. 371 of International Application No. PCT/KR2018/003991, filed on Apr. 4, 2018, which claims the benefit of Korean Application No. 10-2017-0043855, filed on Apr. 4, 2017. The disclosures of the prior applications are incorporated by reference herein in their entirety.

TECHNICAL FIELD

The present invention relates to a compressor driving apparatus and a refrigerator including the same, more particularly, to a compressor driving apparatus capable of improving control accuracy and reducing a noise upon piston position based operation control, and a refrigerator including the same.

BACKGROUND ART

In general, a refrigerator is a device use as usage for freshly storing food for a long time. The refrigerator includes a freezing room for frozen-storing the food, a refrigerating room for refrigeration-storing plants, and a freezing cycle for cooling the freezing room and the refrigerating room, and performs operation control by a controller mounted therein.

Unlike before, since a kitchen space is not simply a space for eating habits but has been changed to an important living space for solving eating habits and where family members converse with each other, there is a need to enlarge a size of a refrigerator being a main element of a kitchen space and to change quantitative and qualitative functions so that the family members may use.

Meanwhile, in order to reduce a noise of the refrigerator and to improve a refrigerant cycle, a linear compressor is used in the refrigerator.

DISCLOSURE

Technical Problem

An embodiment of the present invention provides a compressor capable of improving control accuracy and reducing a noise upon piston position based operation control, and a refrigerator including the same.

Technical Solution

In accordance with an embodiment of the present invention, there is provided a compressor driving apparatus including: an inverter for converting direct current (DC) power into alternating current (AC) power according to a switching operation to output the converted AC power to the motor; an output current detector for detecting an output current flowing through the motor; and an inverter controller for controlling the inverter based on the output current, wherein the inverter controller controls the piston so that one end of the piston is fixed at a first position spaced apart from the discharge unit at stroke of the piston during a first period, controls the piston to collide with the discharge unit when a change rate in an operation rate or a position error of the compressor is equal to or greater than a predetermined value, and controls the piston so that the one end of the piston is fixed at a second position spaced apart from the discharge unit at stroke of the piston during a second period after the collision of the piston.

The compressor driving apparatus according to an embodiment of the present invention may further include a compressor including a cylinder, a discharge unit for discharging fluid into the cylinder, a piston disposed in the cylinder to perform a linear motion in a direction of the discharge unit, and a motor for driving the piston; and a plurality of switching elements.

When the change rate in an operation rate or the position error of the compressor is less than the predetermined value, the inverter controller according to an embodiment of the present invention may control the piston to be fixed to the first position to become the stroke.

The inverter controller according to an embodiment of the present invention may calculates a reference position of the piston based on the output current, may calculate a push amount of the piston by fluid based on the stroke of the piston when the change rate in an operation rate or the position error of the compressor is equal to or greater than the predetermined value, may calculate a current position of the piston based on the push amount of the piston, and may output the switching control signal based on the current position and the reference position of the piston.

The inverter controller according to an embodiment of the present invention may calculate a reference position of the piston based on the output current, the inverter controller may calculate a current position of the piston based on the stroke of the piston when the change rate in an operation rate of the compressor is less than the predetermined value, and may output the switching control signal based on the current position and the reference position of the piston.

The inverter controller according to an embodiment of the present invention may include: a reference position calculator for calculating a reference position of the piston based on the output current; a stroke calculator for calculating the stroke of the piston based on the output current; a push amount calculator for calculating a push amount of the piston by fluid based on the stroke of the piston; a position calculator for calculating a current position of the piston based on the push amount when the change rate in an operation rate of the compressor is equal to or greater than the predetermined value; and a switching control signal output unit for outputting a switching control signal based on the current position and the reference position of the piston.

The inverter controller according to another embodiment of the present invention may include: a reference position calculator for calculating a reference position of the piston based on the output current; a stroke calculator for calculating a stroke of the piston based on the output current; a position calculator for calculating a current position of the piston based on the stroke of the piston when the change rate in an operation rate of the compressor is less than the predetermined value; and a switching control signal output unit for outputting a switching control signal based on the current position and the reference position of the piston.

In accordance with another embodiment of the present invention, there is provided a compressor driving apparatus including: an inverter for converting DC power into AC power according to a switching operation to output the converted AC power to the motor; an output current detector for detecting an output current flowing through the motor; and an inverter controller for controlling the inverter based on the output current, wherein the inverter controller calculates a reference position of the piston based on the output current, calculates a push amount of the piston by fluid based on a stroke of the piston when the change rate in an operation rate of the compressor is equal to or greater than a predetermined value, calculates a current position of the piston based on the push amount of the piston, and outputs a switching control signal based on the current position and the reference position of the piston.

A compressor driving apparatus according to an embodiment of the present invention to achieve the above objective includes: an inverter for converting DC power into AC power according to a switching operation to output the converted AC power to the motor; an output current detector for detecting an output current flowing through the motor; and an inverter controller for controlling the inverter based on the output current, wherein the inverter controller controls the piston so that one end of the piston is fixed at a first position spaced apart from the discharge unit at stroke of the piston during a first period, controls the piston to collide with the discharge unit when a change rate in an operation rate or a position error of the compressor is equal to or greater than a predetermined value, and controls the piston so that the one end of the piston is fixed at a second position spaced apart from the discharge unit at stroke of the piston during a second period after the collision of the piston.

The compressor driving apparatus according to an embodiment of the present invention may further include a compressor including a cylinder, a discharge unit for discharging fluid into the cylinder, a piston disposed in the cylinder to perform a linear motion in a direction of the discharge unit, and a motor for driving the piston; and a plurality of switching elements.

In accordance with another embodiment of the present invention, there is provided a refrigerator including: an inverter for converting DC power into AC power according to a switching operation to output the converted AC power to the motor; an output current detector for detecting an output current flowing through the motor; and an inverter controller for controlling the inverter based on the output current, wherein the inverter controller calculates a reference position of the piston based on the output current, calculates a push amount of the piston by fluid based on a stroke of the piston when the change rate in an operation rate of the compressor is equal to or greater than a predetermined value, calculates a current position of the piston based on the push amount of the piston, and outputs a switching control signal based on the current position and the reference position of the piston.

Advantageous Effects

A motor driving apparatus and a home appliance according to an embodiment of the present invention includes an inverter for converting DC power into AC power to output the converted AC power to a motor; an output current detector for detecting an output current flowing through the motor; and an inverter controller for controlling the inverter based on the output current. The inverter controller controls a piston so that one end of the piston is fixed at a first position spaced apart from the discharge unit at stroke of the piston during a first period. When a change rate in operation rate or a position error of the compressor is equal to or greater than a predetermined value of the compressor, the inverter controller controls the piston to collide with a discharge unit. After the position collides with the discharge unit, the inverter controller controls the piston to be fixed to a second position for a second period to become stroke so that control accuracy may be improved and a noise may be reduced upon piston position based operation control.

In particular, only when a change rate in operation rate of the compressor is equal to or greater than the predetermined value, the inverter controller controls the piston to collide with a discharge unit so that control accuracy may be improved and a noise may be reduced upon piston position based operation control.

Meanwhile, when the change rate in operation rate of the compressor is less than the predetermined value, the inverter controller controls the piston to be fixed to the first position to become stroke not to collide the piston with the discharge unit so that control accuracy may be improved and a noise may be reduced upon piston position based operation control.

Meanwhile, a discharge unit at a low cost may be used by performing the piston position based operation control.

A motor driving apparatus and a home appliance according to an embodiment of the present invention includes an inverter for converting DC power into AC power to output the converted AC power to a motor; an output current detector for detecting an output current flowing through the motor; and an inverter controller for controlling the inverter based on the output current. The inverter controller calculates a reference position of the piston based on the output current. When the change rate in operation rate of the compressor is equal to or greater than the predetermined value, the inverter controller calculates a push amount of the piston according to fluid based on the stroke of the piston, and calculates a current position of the piston based on the push amount, and outputs a switching control signal based on a current position of a reference position of the piston so that control accuracy may be improved and a noise may be reduced upon piston position based operation control.

In particular, only when the change rate in operation rate of the compressor is equal to or greater than the predetermined value, the inverter controller controls the motor based on the push amount of the piston so that control accuracy may be improved and a noise may be reduced upon piston position based operation control.

Meanwhile, when the change rate in operation rate of the compressor is less than the predetermined value, the inverter controller calculates a current position of the piston based on the stroke of the piston, and outputs a switching control signal based on a current position of a reference position of the piston so that control accuracy may be improved and a noise may be reduced upon piston position based operation control.

DESCRIPTION OF DRAWINGS

FIG. 1 is a perspective view illustrating a refrigerator according to an embodiment of the present invention.

FIG. 2 is a perspective view illustrating an open door of the refrigerator shown in

FIG. 1.

FIG. 3 is a view illustrating an ice making device shown in FIG. 2.

FIG. 4 is a view schematically illustrating a configuration of the refrigerator shown in FIG. 1.

FIG. 5 is a block diagram schematically illustrating an inside of the refrigerator shown in FIG. 1.

FIG. 6 is a circuit diagram illustrating a compressor driver shown in FIG. 5.

FIG. 7 is a view illustrating a compressor shown in FIG. 4 or FIG. 5.

FIG. 8 is a reference view for position control of a piston shown in FIG. 7.

FIG. 9 is a circuit diagram illustrating an example of an inside of the inverter controller shown in FIG. 6.

FIG. 10 is a flowchart illustrating an operation method of a compressor driving apparatus according to an embodiment of the present invention.

FIG. 11 is a reference diagram illustrating an operation method of FIG. 10.

FIG. 12 is a flowchart illustrating an operation method of the compressor driving apparatus according to the present invention.

FIG. 13 is a flowchart illustrating an operation method of a compressor driving apparatus according to another embodiment of the present invention.

FIG. 14*a* to FIG. 15*b* is reference diagrams illustrating an operation method of FIG. 13.

BEST MODE

Hereinafter, the present invention will be described in detail with reference to the accompanying drawings.

In the following description, the suffix "~ unit" and "~ part" may be used to facilitate the description of the specification and may be compatibly used with each other.

FIG. 1 is a perspective view illustrating a refrigerator according to an embodiment of the present invention.

Referring to FIG. 1, a schematic exterior of the refrigerator 100 is formed by a case 110 including an inner space divided into a freezing room and a refrigerating room, a freezing room door 120 shielding the freezing room, and a refrigerating room door 140 shielding the refrigerating room.

Further, a door handle protrudes forward from front surfaces of the freezing room door 120 and the refrigerating room door 140 so that a user may easily grasp the door handle 121 to rotate the freezing room door 120 and the refrigerating room door 140.

Meanwhile, a home bar 180 being convenient means capable of ejecting storage objects such as beverages received therein without opening the refrigerating room door 140 may be provided at a front surface of the refrigerating room door 140.

Furthermore, a dispenser 160 being convenient means capable of ejecting ice or water without opening the freezing room door 120 may be provided at a front surface of the freezing room door 120. A control panel 210 may be provided at a top side of the dispenser 160 and controls driving operation of the refrigerator 100 and shows a state of an operating refrigerator 100 on a screen.

Meanwhile, although FIG. 1 shows that the dispenser 160 is disposed at a front surface of the freezing room door 120, the present invention is not limited thereto. The dispenser 160 may be disposed at a front surface of the refrigerating room door 140.

Meanwhile, an ice making device 190 for ice-making supplied water using cold air inside the freezing room and an ice bank 195 for storing the ice from the ice making device 190 may be further provided at an inner top portion of the freezing room (not shown). Moreover, although not shown, an ice suit (not shown) for guiding the ice stored in the ice bank 195 to be dropped to the dispenser 160 may be provided. The ice making device 190 will be described with reference to FIG. 3 later.

The control panel 210 may include an input unit 220 configured by a plurality of buttons and a display unit 230 for displaying a control screen and an operation state.

The display unit 230 displays information such as a control screen, an operation state, and a temperature inside the refrigerator. For example, the display unit 230 may display a service shape (angle ice, water, and piece ice) of the dispenser, preset temperature of a freezing room, and a preset temperature of a refrigerating room.

The display unit 230 may be variously implemented by a LCD, an LED, or an OLED. The display unit 230 may be implemented by a touch screen capable of performing a function of the input unit 220.

The input unit 220 may include a plurality of operation buttons. For example, the input unit 220 may include a dispenser setting button (not shown) for setting a service shape (angle ice, water, and piece ice) of the dispenser, a freezing room temperature setting button (not shown) for setting a temperature of a freezing room, and a refrigerating room temperature setting button for setting a temperature of a refrigerating room. The input unit 220 may be implemented by a touch screen capable of performing a function of the display unit 230.

Meanwhile, the refrigerator according to an embodiment of the present invention is not limited to a double door type refrigerator which is shown in FIG. 1. A door type of the refrigerator is not specially limited if one door type refrigerator, a sliding door type refrigerator, or a curtain door type refrigerator including an ice bank 195 and an ice band vibrating unit 175 for vibrating the ice bank 195 which are disposed at an inner side of the freezing room to be described below.

FIG. 2 is a perspective view illustrating an open door of the refrigerator shown in FIG. 1.

Referring to FIG. 2, a freezing room 155 is disposed at an inner side of a freezing room door 120, and a refrigerating room 157 is disposed at an inner side of a refrigerating room door 140.

An ice making device 190 for ice-making supplied water using cold air inside the freezing room 155, an ice bank 195 for storing the ice from the ice making device 190, an ice bank vibrating unit 175 for vibrating the ice bank 195, and a dispenser 160 may be further provided at an inner top portion of the freezing room 155. Moreover, although not shown, an ice suit (not shown) for guiding the ice stored in the ice bank 195 to be dropped to the dispenser 160 may be provided.

FIG. 3 is a view illustrating an ice making device shown in FIG. 2.

Referring to FIG. 3, an ice making device 190 includes an ice making tray 212 for storing water for making ice to make an ice having a predetermined shape, a water supply part 213 for supplying water to the ice making tray 212, a slider 214 for sliding the ice to the ice bank 190, and a heater (not shown) for separating the ice from the ice making tray 212.

The ice making tray 212 may be locked with the freezing room 155 of the refrigerator by a locking part 212*a*.

In addition, the ice making device 190 further includes an ice making driver 216 for operating an ejector 217, and the ejector 217 axially coupled with a motor (not shown) in the ice making driver 216 to eject the complete ice from the ice making tray 212 to the ice bank 195.

The ice making tray 212 has a substantially semi-cylindrical shape. Division protrusions 212*b* are formed at an inner side of the ice making tray 212 at a predetermined interval so that the ice may be separated and ejected.

Moreover, the ejector 217 includes a shaft 217*a* formed through a center of the ice making tray 212 and a plurality of ejector pins 217*b* formed at the shaft 271*a* of the ejector 217.

Here, the ejector pins 217*b* are located between division protrusions 212*b*, respectively.

The ejector pin 217*b* is a means for ejecting the made ice to the ice bank 195. For example, the ice moved by the ejector pin 217*b* is put on the slider 214 and slides along the slider 214 side to be dropped to the ice bank 195.

Meanwhile, although is not shown in FIG. 3, a heater (not shown) is attached to a bottom surface of the ice making tray 212, increases a temperature of the ice making tray 212 to melt an ice formed on the ice making tray 212 surface so that the ice is separated from the ice making tray 212. The separated ice is discharged to the ice bank 195 by the ejector 217.

Meanwhile, the ice making device 190 may further include an optical transmitter 233 and an optical receiver 234 for detecting whether an ice bank 195 located at a lower portion of the ice making device 190 is filled with ice (hereinafter referred to as 'full ice detection') before the ice is separated from the ice making tray 212.

The optical transmitter 233 and the optical receiver 234 may be disposed at a lower portion of the ice making device 190, and may transmit and receive light to and from the ice bank 195 using an infrared sensor or a light emitting diode (LED).

For example, when the infrared sensor is used, an infrared transmitter 233 and an infrared receiver 234 may be provided at a lower portion of the ice making device 190, respectively. When the ice is not full ice, the infrared receiver 234 receives a high level signal. When the ice is the full ice, the infrared receiver 234 receives a low level signal. Accordingly, a main controller 310 determines whether the ice is the full ice. Meanwhile, one or more infrared receivers 234 may be used, and two infrared receivers 234 are shown in FIG. 3.

Meanwhile, the optical transmitter 233 and the optical receiver 234 may be implemented as a structure buried in a lower case 219 of the ice making device 190 in order to protect a device from humidity and frost due to the ice.

The signal received by the optical receiver 234 is input to the main controller 310. When the ice is the full ice, the main controller 310 controls an operation of the ice making driver 216 not to eject the ice to the ice bank 195 longer.

Meanwhile, an ice bank vibrating unit 175 for vibrating the ice bank 195 may be disposed at a bottom end of the ice bank 195. In FIG. 3, although the ice bank vibrating unit 175 is disposed at a bottom end of the ice bank 195, the present invention is not limited thereto. The ice bank vibrating unit 175 may be disposed at a close position such as a lateral side if the ice bank vibrating unit 175 may vibrate the ice bank.

FIG. 4 is a view schematically illustrating a configuration of the refrigerator shown in FIG. 1.

Referring to FIG. 4, the refrigerator 100 may include a compressor 112, a condenser 116 for condensing a refrigerant compressed from the compressor 112, a freezing room evaporator 124 for receiving and evaporating the condensed refrigerant from the condenser 116 and disposed at a freezing room (not shown), and a freezing room expansion valve 134 for expanding the refrigerant supplied from the freezing room evaporator 124.

Meanwhile, although FIG. 4 illustrates one evaporator, evaporators may be used at a refrigerating room and a freezing room, respectively.

That is, the refrigerator 100 may further include a refrigerating room evaporator (not shown), a 3-way valve (not shown) for supplying the refrigerant condensed from the condenser 116 to the refrigerating room evaporator (not shown) or the freezing room evaporator 124, and a freezing room expansion valve (not shown) for expanding the refrigerant supplied from the refrigerating room evaporator (not shown).

Furthermore, the refrigerator 100 may further include a gas-liquid separator for separating the refrigerant from the freezing room evaporator 124 into liquid and gas.

Moreover, the refrigerator 100 may further include a refrigerating room fan (not shown) and a freezing room fan 144 for sucking cold air from the freezing evaporator 124 to blow the sucked cold air to the refrigerating room (not shown) and the freezing room (not shown), respectively.

Moreover, the refrigerator 100 may further include a compressor driver 113 for driving the compressor 112 and a refrigerating room fan driver (not shown) for driving a refrigerating room fan (not shown), and a freezing room fan driver 145 for driving the freezing room fan 144.

Meanwhile, as shown, since the refrigerating room and the freezing room use a common evaporator 124, a damper (not shown) may be installed between the refrigerating room and the freezing room in this case. A fan (not shown) may forcibly blow the cold air from one evaporator to supply the blown cold air to the refrigerating room and the freezing room FIG. 5 is a block diagram schematically illustrating an inside of the refrigerator shown in FIG. 1.

Referring to FIG. 5, the refrigerator includes a compressor 112, a machine room fan 115, a freezing room fan 144, a main controller 310, a heater 330, an ice making device 190, an ice bank 195, a temperature sensor 320, and a memory 240. Further, the refrigerator may further include a compressor driver 113, a machine room fan driver 117, a freezing room fan driver 145, a heater driver 332, an ice making driver 216, an ice bank vibrating unit 175, a display unit 230, and an input unit 220.

The compressor 112, the machine room fan 115, and the freezing room fan 144 will be described with reference to FIG. 2.

The input unit 220 includes a plurality of operation buttons to transfer a signal with respect to a freezing room setting temperature or a refrigerating room setting temperature to the main controller 310.

The display unit 230 may display an operation state of the refrigerator 100. The display unit 230 may be operated under control of a display controller (not shown).

The memory 240 may store data necessary for operating the refrigerator.

The temperature sensor 320 detects a temperature in the refrigerator 100 to transfer a signal with respect to the detected temperature to the main controller 310. Here, the temperature sensor 320 detects a temperature of the refrigerating room and a temperature of the freezing room. Further, the temperature sensor 320 may detect a temperature of each room in the refrigerating room or a temperature of each room in the freezing room.

As shown, the main controller 310 may control the compressor driver 113 and a machine room fan driver 117 or a freezing room fan driver 145 to finally the compressor 112, and a machine room fan 115 or a freezing room fan 144 in order to control on/off operation of the compressor 112 and the machine room fan 115 or the freezing room fan 144. Here, the fan driver may include a machine room fan driver 117 or the freezing room fan driver 145.

For example, the main controller 310 may output a corresponding speed command signal to the compressor driver 113 or the machine room fan driver 117 or the freezing room fan driver 145.

The compressor driver 113 and the freezing fan driver 145 may include a motor for the compressor (not shown) and a motor for the freezing room (not shown) so that each motor (not shown) may be operated at target rotation speed under control of the main controller 310.

Meanwhile, the machine room fan driver 117 may include a motor for a machine room fan so that the motor for a machine room fan may be operated at target rotation speed under control of the main controller 310.

When the motor is a three phase motor, the three phase motor may be controlled by a switching operation in the inverter (not shown) or may be control at constant speed using AC power. Here, each motor (not shown) may be one of an induction motor, Blushless DC (BLDC) motor, or a synchronous reluctance motor (synRM).

Meanwhile, as described above, the main controller 310 may control an overall operation of the refrigerator 100 as well as operations of the compressor 112 and the fan 115 or 144.

For example, the main controller 310 may control an operation of the ice bank vibrating unit 175. In particular, when full ice is detected, the main controller 310 controls the ice making device 190 to eject the ice to the ice bank 195. Further, the main controller 310 may control the ice bank 195 to vibrate upon ejection of the ice or within a predetermined after the ejection of the ice. In this manner, upon the ejection of the ice, by vibrating the ice bank 195, the ice in the ice bank 195 may be uniformly distributed without getting tangled.

Moreover, the main controller 310 may repeatedly vibration the ice bank 195 at a predetermined time interval in order to prevent the ice from getting tangled because the ice is continuously maintained in the ice bank 195.

Furthermore, when the dispenser 160 is operated by an operation of a user, the main controller 310 controls the ice in the ice bank 195 to be ejected to the dispenser 160. Moreover, upon the ejection of the ice or just before the ejection of the ice, the main controller 310 may control the ice bank 195 to vibrate. In detail, the main controller 310 may control the ice bank vibrating unit 175 to operate the ice bank 195. Accordingly, upon the ejection of the ice, it may prevent the ice ejected to the user from getting tangled.

The main controller 310 may control a heater (not shown) in the ice making device 190 to operate in order to remove the ice in the ice making tray 212.

Meanwhile, after on-operation of the heater (not shown), the main controller 310 may control the ice making driver 216 to operate an ejector 217 in the ice making device 190. The above is a control operation to easily eject the ice into the ice bank 195.

Meanwhile, when it is determined that ice in the ice bank 195 is full ice, the main controller 310 may control the heater (not shown) to be turned-off. In addition, the main controller 310 may control the ejector 217 in the ice making device 190 to stop.

Meanwhile, as described above, the main controller 310 may control an overall operation of a refrigerant cycle according to a preset temperature from the input unit 220. For example, the main controller 310 may control a 3-way valve 130, the refrigerating room expansion valve 132, and a freezing room expansion valve 134 besides the compressor driver 113, the refrigerating room fan driver 143, and the freezing room fan driver 145. Further, the main controller 310 may control an operation of the condenser 116. Moreover, the main controller 310 may control an operation of the display unit 230.

Meanwhile, the heater 330 may include a freezing room defrost heater. In order to remove frost on the freezing room evaporator 124, the freezing room defrost heater 330 may operate. To this end, the heater driver 332 may control an operation of the heater 330. Meanwhile, the main controller 310 may control the heater driver 332.

FIG. 6 is a circuit diagram illustrating a compressor driver shown in FIG. 5.

Referring to FIG. 6, the compressor driver 113 according to an embodiment of the present invention may include a converter 410, an inverter 420, an inverter controller 430, a dc stage voltage detector B, a smooth capacitor C, and an output current detector E. Further, the compressor driver 113 may further include an input current detector A. In this case, it is preferred that the input current detector A is the same as the input current detector A of FIG. 6.

The converter 410 converts normal AC power 405 into DC power to output the DC power. Although FIG. 6 illustrates that the normal AC power 405 is single-phase AC power, the normal AC power 405 may be three-phase AC power. An internal structure of the converter 410 may be changed according to a type of the normal AC power 405.

Meanwhile, the converter 410 may be configured by a diode without a switching element to perform a rectification operation without a separate switching operation.

For example, when the normal AC power 405 is the single-phase AC power, four diodes may be used in a bridge form. When the normal AC power 405 is the three-phase AC power, six diodes may be used in a bridge form.

Meanwhile, for example, the converter 410 may use a half-bridge converter where two switching elements and four diodes are connected with each other. When the normal AC power 405 is the three-phase AC power, six switching elements and six diodes may be used.

When the converter 410 includes a switching element, the converter 410 may perform a boost operation, power factor improvement, and DC power conversion by a switching operation of a corresponding switching element.

The capacitor C smooths and stores input power. Meanwhile, the capacitor C may be the same as a capacitor C of FIG. 6.

A dc stage voltage detector B may detect a dc stage voltage Vdc across the smooth capacitor C. To this end, the dc stage voltage detector B may include a resistor and an amplifier. The detected dc stage voltage Vdc is a discrete signal of a pulse form and may be input to the inverter controller 430. Meanwhile, the dc stage voltage detector B may be the same as the dc stage voltage detector B of FIG. 6.

The inverter 420 includes a plurality of inverter switching elements, and may convert the smoothed DC power Vdc into three-phase AC power va, vb, and vc of a predetermined frequency to output the converted three-phase AC power va, vb, and vc to a three phase synchronous motor 630.

Upper switching elements Sa, Sb, Sc and lower switching elements S'a, S'b, S'c serially connected with each other form a pair. The inverter 420 includes three pairs of upper and lower switching elements Sa & S'a, Sb & S'b, Sc & S'c which are connected with each other in parallel. A diode is connected with each of the switching elements Sa, S'a, Sb, Sb, Sc, and S'c in antiparallel.

The switching elements in the inverter 420 perform on/off operation of each switching element based on an inverter switching control signal Sic from the inverter controller 430. Accordingly, three phase AC power having a predetermined frequency is output to the three phase synchronous motor 630.

The inverter controller 430 may control a switching operation of the inverter 420. To this end, the inverter controller 430 may receive an output current io detected from the output current detector E.

The inverter controller 430 outputs the inverter switching control signal Sic to the inverter 420 in order to control a switching operation of the inverter 420. The inverter switching control signal Sic is a pulse width modulation (PWM) switching control signal, and is generated and output based on an output current io detected from the output current detector E. A detailed operation with respect to an output of the inverter switching control signal Sic in the inverter controller 430 will be described with reference to FIG. 9 below.

The output current detector E detects the output current io flowing between the inverter 420 and a three phase motor 630. That is, the output current detector E detects the current flowing through the three phase synchronous motor 630. The output current detector E may detect all of the output currents ia, ib, and ic of respective phases, or may detect output currents of two phases using three phase equilibrium.

The output current detector E may be located between the inverter 420 and the three phase synchronous motor 630. The output current detector E may use a current transformer (CT) or a shunt resistor to detect a current.

When the shunt resistor is used, three shunt resistors may be located between the inverter 420 and the three phase synchronous motor 630 or each one end of the three shunt resistors may be coupled with three lower switching elements S'a, S'b, and S'c. Meanwhile, two shunt resistors may be used using three phase equilibrium. Meanwhile, when one shunt resistor is used, a corresponding shunt resistor may be arranged between the capacitor C and the inverter 420.

The detected output current io is a discrete signal of a pulse form, may be applied to the inverter controller 430, and an inverter switching control signal Sic is generated based on the detected output current io. The following description will be made that the detected output current io is output currents ia, ib, and ic of three phases.

Meanwhile, a compressor motor 630 may be a three phase motor. The compressor motor 630 includes a stator and a rotor, and applies AC power of each phase having a predetermined frequency to a coil of a stator of each phase (a, b, c phases) to rotate the rotor.

For example, the compressor motor 630 may include a surface-mounted permanent-magnet synchronous motor (SMPMSM), an interior permanent magnet synchronous motor (IPMSM), and a synchronous reluctance motor (Synrm). Among them, the SMPMSM and the IPMSM are a permanent magnet synchronous motor (PMSM) including a permanent magnet, and the Synrm does not have the permanent magnet.

FIG. 7 is a view illustrating a compressor shown in FIG. 4 or FIG. 5.

Referring to FIG. 7, a compressor 112 may be a linear compressor.

The linear compressor 112 may include a hollow cylinder 720 including a compression chamber C1 formed at one end thereof inside the compressor case 710 and a piston 730 performing a linear reciprocating motion in the cylinder 720 to compress fluid in the compression chamber C1.

The compression chamber C1 may be formed therein with a discharge unit 746 which sucks fluid to compress the fluid and to discharge compressed fluid. The discharge unit 746 may be a reciprocal discharge unit.

Meanwhile, the suction and the discharge of the fluid of the compression chamber C1 may be alternately performed.

Meanwhile, a suction part for sucking fluid through the compressor case 710 and a discharge part for discharging the fluid may be formed at both ends of the compressor case 710, respectively.

Meanwhile, the cylinder 720 may be buffered with the compressor case 710 through a damper (not shown).

Meanwhile, the linear compressor 112 may further include a linear motor 630. The linear motor 630 generates driving force for compressing the fluid.

The piston 730 for compressing the fluid sucked into the cylinder 720 while performing the linear reciprocating motion may be connected with the linear motor 630.

The linear motor 630 may include an outer core 772 configured by a laminate, an inner core 771 spaced apart from the outer core 772 by a predetermined gap, and a coil 775 mounted at the outer core 772 to form a magnetic field.

Further, the linear motor 630 includes a magnet 750 located between the outer core 772 and the inner core 771 and performing a linear motion by a magnetic field formed around the coil 775 through applied power, and a magnet frame 755 to which the magnet 750 and the piston 730 are fixed and to transfer a linear motion force to the piston 730.

The piston 730 may be supported by a spring 743 disposed between the cylinder 720 and the piston 730, and may be operated by a restoring force.

The piston 730 has a blocked structure not to suck the fluid therein, and sucked fluid may be compressed in only the compression chamber C1.

An operation of a linear compressor 112 according to an embodiment of the present invention will described as follows.

First, when a linear motor 630 is operated, the magnet 750 performs a linear reciprocating motion by interaction with a magnetic field around the coil 775. The motion force is transferred to the piston 730 and a spring (not shown) through a magnet frame 755 so that the piston 730 may continuously perform a linear reciprocating motion by resonance with a spring (not shown).

In this case, if the piston 730 advances toward the compression chamber C1, the fluid in the compression chamber C1 is compressed, and the discharge unit 746 may be open in order to discharge the compressed fluid.

Meanwhile, the cylinder 720 has a hollow cylindrical shape. A long hole for guiding a wing of the piston 730 may be formed at a partial region of a cylinder.

The piston 730 may be inserted into the cylinder 720 to form the compression chamber C1 at an end of the cylinder 720. Furthermore, the cylinder 720 may be connected with an external linear motor 630 and includes a cylinder wing to transfer a motion force. The cylinder wing may perform the linear reciprocating motion between long holes of the piston 730.

Meanwhile, in the present invention, in order to control a motion of the piston 730, position control of the piston 730 is performed based on a position difference between the piston 730 and the discharge unit 746 which is not stroke control corresponding to a momentum of the piston 730.

FIG. 8 is a reference view for position control of a piston shown in FIG. 7.

In order to control a position of the piston 730 based on a position difference between the piston 730 and the discharge unit 746, various variables may be set as illustrated in FIG. 8.

Referring to FIG. 8, Xo represents an initial value (initial position of a piston) between P2 and P1, Xdc represents a push amount between P1 and P0, Xtdc between P2 and P4 represents a position difference between the piston 730 and the discharge unit 746, that is, a position of the piston 730, Xv represents a reference position between P2 and P3, Xv_obj represents Xtdc calculated at a Xv position, and Stk represents a stroke distance between P4 and P5.

Meanwhile, the position Xtdc of the piston 730 may be calculated by a following equation 1.

In this case, a damping coefficient Cgas and a gas spring coefficient Kgas of the spring 743 may be used to calculate the position Xtdc of the piston 730.

$$X_{tdc} = X_o + X_{dc} - \frac{S_{tk}}{2}$$ [Equation 1]

That is, the position Xtdc of the piston 730 may be calculated based on the initial position Xo of the piston 730, the push amount Xdc, and the stroke distance Stk.

Meanwhile, the position Xtdc of the piston 730 in the equation 1 may be more precisely calculated through leaning.

That is, the position Xtdc of the piston 730 in the equation 1 may be more exactly calculated through calculation error compensation at a reference position.

That is, a current position Xtdc_c of the piston 730 may be calculated by leaning using a following equation 2.

$$X_{tdc\_c} = X_{tdc} + (X_f - X_{f\_obj})$$ [Equation 2]

Meanwhile, the compressor motor 630 may be controlled based on a difference between a target position Xtdc_ref of the piston 730 and the current position Xtdc_c of the piston 730 calculated in the equation 2.

FIG. 9 is a circuit diagram illustrating an example of an inside of the inverter controller shown in FIG. 6.

Referring to FIG. 9, the inverter controller 430 may include a stroke calculator 910, a push amount calculator 915, a phase difference calculator 920, a reference position calculator 925, a position calculator 930, and a switching control signal output unit 960.

The stroke calculator 910 may calculate a stroke of the piston 930 based on the output current io from the output current detector 905.

The push amount calculator 915 may calculates a push amount of the piston 730 by fluid based on the stroke of the piston 730.

The phase difference calculator 920 may calculates a phase difference between the output current io applied to the compressor motor 630 and an output voltage based on the output current io from the output current detector 905. To this end, although not shown, an output voltage detector for detecting an output voltage applied to the compressor motor 630 may be further provided.

Alternatively, the phase difference calculator 920 may calculate a phase difference which is a difference between a waveform of the output current io and a waveform of the stroke calculated from the stroke calculator 910.

Next, the reference position calculator 925 may calculate a reference position of the piston 730 based on the output current. In particular, the reference position calculator 925 may represent the Xtdc calculated in an Xv position.

The position calculator 930 may calculate a current position Xtdc of the piston 730 based on the push amount.

Meanwhile, the switching control signal output unit 960 may output the switching control signal Sic based on the current position Xtdc and the reference position Xv.

In detail, the switching control signal output unit 960 may output a PWM based on switching control signal Sic so that the calculated current position Xtdc_c tracks the target position Xtdc_ref based on the calculated current positon Xtdc_c being a difference between the current position Xtdc and the reference position Xv and the target position Xtdc_ref.

Accordingly, the position of the position 730 may correspond to a desired target position Xtdc_ref. Accordingly, position based control of the piston 730 which is not stroke based control is possible.

FIG. 10 is a flowchart illustrating an operation method of a compressor driving apparatus according to an embodiment of the present invention, and FIG. 11 is a reference diagram illustrating an operation method of FIG. 10.

Referring to FIG. 10 and FIG. 11, an inverter controller 430 controls a piston 730 so that one end of the piston is fixed at a first position spaced apart from the discharge unit at stroke of the piston during a first period (S1410).

The inverter controller 430 may calculate a reference position and a current position of the piston 730 as shown in FIG. 8 and FIG. 9 based on an output current flowing through the compressor motor 630, and may control the piston 730 to be fixed to a first position being a first target position based on the reference position and the current position.

FIG. 11(*a*) illustrates that the piston 730 is located at a first position Px, which is spaced apart from a discharge end P2, to perform a stroke. That is, FIG. 11(*a*) illustrates that the piston 730 reciprocates between the Px and a Py.

When the inverter controller 430 is operated as illustrated in FIG. 8 and FIG. 9, an error between the reference position and the current position of the piston 730 may be gradually increased. In particular, the error between the reference position and the current position of the piston 730 may be increased according to the change rate in an operation rate of the compressor 112.

In this case, despite the position control of the piston 730, exact control cannot be performed. Accordingly, the present invention presents a method of controlling the piston 730 not to collide with the discharge unit 746 in order to control an exact position. Next, the piston 730 is fixed to a second position to become the stroke.

That is, when a change rate in an operation rate or a position error of the compressor 112 is equal to or greater than a predetermined value (S1425), the inverter controller 430 controls the discharge unit 746 to collide with the piston 730 (S1430). Next, the inverter controller 430 controls a piston 730 so that the one end of the piston is fixed at a second position spaced apart from the discharge unit at stroke of the piston during a second period (S1440). In this case, the second position Pm is farther from the discharge unit 746 as compared with the first position Px.

FIG. 11(*b*) illustrates the piston 730 colliding with the discharge unit 746.

The inverter controller 430 may control collision of the piston 730 with the discharge unit 746 by position control. Accordingly, damage danger of the reciprocal discharge unit 746 is reduced. Accordingly, the reciprocal discharge unit 746 at a low cost may be used.

Next, FIG. 11(*c*) illustrates that the piston 730 is located at a second position Pm to perform a stroke. That is, FIG. 11(*c*) illustrates that the piston 730 reciprocates between the Pm and a Pn.

In particular, when a change rate in an operation rate or a position error of the compressor 112 is equal to or greater than a predetermined value, as shown in FIG. 11(*b*), the inverter controller 430 collides the piston 730 with the discharge unit 746, and controls the piston 730 to be fixed to the second position for the second period in a reset state to become the stroke, so that an exact position of the piston 730 may be controlled.

Meanwhile, as shown in FIG. 11(*b*), if the collision of the piston 730 with the discharge unit 746 is periodically performed, the noise occurs. Accordingly, in order to reduce the noise, it is advantageous to rarely perform the collision of the piston 730 with the discharge unit 746 if possible.

Accordingly, only when a change rate in an operation rate or a position error of the compressor 112 is equal to or greater than a predetermined value, the present invention is limited to perform the collision of the piston 730 with the discharge unit 746. Accordingly, the noise at an operation of the piston 730 may be finally reduced.

Meanwhile, when a change rate in an operation rate or a position error of the compressor 112 is less than a predetermined value, the inverter controller 430 may control the piston 730 to be fixed to the first position to become the stroke.

Meanwhile, at step S1410, the inverter controller 430 may calculate a reference position of a piston 730 based on an output current, calculate a push amount of the piston 730 based on the stroke of the piston 730, calculate a current position based on the calculated push amount, and output a switching control signal Sic based on the current position and the reference position of the piston 730. Accordingly, the inverter controller 430 may control the piston 730 to be fixed to the first position Px to become the stroke. That is, as illustrated in FIG. 15*a*, the piston 730 may be operated.

Meanwhile, at step S1440, the inverter controller 430 may calculate a reference position of a piston 730 based on an output current, calculate a push amount of the piston 730 based on the stroke of the piston 730, calculate a current position based on the calculated push amount, and output a switching control signal Sic based on the current position and the reference position of the piston 730. Accordingly, the inverter controller 430 may control the piston 730 to be fixed to the second position Pm to become the stroke. That is, as illustrated in FIG. 15*a*, the piston 730 may be operated.

Meanwhile, the inverter controller 430 calculates a reference position of the piston 730 based on the output current. When the change rate in an operation rate of the compressor 112 is equal to or greater than a predetermined value, as shown in FIG. 15*a*, the inverter controller 430 may calculate a push amount of the piston 730 by fluid based on the stroke of the piston 730, calculate a current position of the piston 730 based on the push amount, and output a switching control signal Sic based on the current position and the reference position of the piston 730.

Meanwhile, the inverter controller 430 calculates a reference position of the piston 730 based on the output current. When the change rate in an operation rate of the compressor 112 is less than the predetermined value, as shown in FIG. 15*b*, the inverter controller 430 may calculate a current position of the piston 730 based on the stroke of the piston 730, and output a switching control signal Sic based on the current position and the reference position of the piston 730.

Meanwhile, as shown in FIG. 15*a*, the inverter controller 430 may include a reference position calculator 925 for calculating a reference position of the piston 730 based on an output current; a stroke calculator 910 for calculating a stroke of the piston 730 based on the output current; a push amount calculator 915 for calculating a push amount of the piston 730 by fluid based on the stroke of the piston 730; a position calculator 930 for calculating a current position of the piston 730 based on a push amount when the change rate in an operation rate of the compressor 112 is equal to or greater than the predetermined value; and a switching control signal output unit 960 for outputting a switching control signal based on the current position and the reference position of the piston 730.

Meanwhile, as shown in FIG. 15*b*, the inverter controller 430 may include a reference position calculator 925 for calculating a reference position of the piston 730 based on an output current; a stroke calculator 910 for calculating a stroke of the piston 730 based on the output current; a position calculator 930 for calculating a current position of the piston 730 based on the stroke of the piston 730 when the change rate in an operation rate is less than the predetermined value; and a switching control signal output unit 960 for outputting a switching control signal based on the current position and the reference position of the piston 730.

FIG. 12 is a flowchart illustrating an operation method of the compressor driving apparatus according to the present invention.

Referring to FIG. 12, an output current detector 905 detects an output current flowing through a compressor motor 630 (S1010).

Next, an inverter controller 430 calculates a reference position of a piston 730 based on the output current (S1020).

Then, the inverter controller 430 calculates a current position of the piston 730 based on a stroke of the piston 730 (S1040).

After that, the inverter controller 430 outputs a switching control signal based on the current position and the reference position of the piston 730 (S1050).

According to the operation method of the compressor driving apparatus of FIG. 12, the position of the piston 730 is controlled. However, an error between the current position and the reference position is accumulated so that exact position control cannot be performed.

FIG. 13 is a flowchart illustrating an operation method of a compressor driving apparatus according to another embodiment of the present invention, and FIG. 14*a* to FIG. 15*b* are reference diagrams illustrating an operation method of FIG. 13.

Referring to FIG. 13, an output current detector 905 detects an output current flowing through a compressor motor 630 (S1210).

Next, an inverter controller 430 calculates a reference position of a piston 730 based on the output current (S1220).

Next, the inverter controller 430 determines whether the change rate in an operation rate of a compressor 112 is equal to or greater than a predetermined value (S1225). When the change rate in an operation rate of a compressor 112 is equal to or greater than the predetermined value, the inverter controller 430 calculates a push amount of the piston 730 by fluid based on a stroke of the piston 730 (S1230).

Next, the inverter controller 430 calculates a current position of the piston 730 based on a push amount (S1240).

Then, the inverter controller 430 outputs a switching control signal based on the current position and the reference position of the piston 730 (S1250).

When the change rate in an operation rate of a compressor 112 is less than the predetermined value at step S1225, the inverter controller 430 calculates a current position of the piston 730 based on a stroke of the piston 730 (S1227), and outputs a switching control signal based on the current position and the reference position of the piston 730 (S1250).

According to the operation method of the compressor driving apparatus of FIG. 13, the position of the piston 730 is controlled and an error between the current position and the reference position is accumulated. It is determined that a case equal to or greater than the predetermined value corresponds to a case where the change rate in an operation rate of a compressor 112 is equal to or greater than the predetermined value. When the change rate in an operation rate of a compressor 112 is equal to or greater than the predetermined value, the inverter controller 430 may control to change internal calculation.

That is, when the change rate in an operation rate of a compressor 112 is equal to or greater than a predetermined value, the inverter controller 430 may control to calculate as illustrated in FIG. 15a. When the change rate in an operation rate of a compressor 112 is less than the predetermined value, the inverter controller 430 may control to calculate as illustrated in FIG. 15b.

Accordingly, the control accuracy may be improved and a noise may be reduced upon piston 730 position based operation control.

In particular, only when the change rate in an operation rate of a compressor 112 is equal to or greater than the predetermined value, a motor 630 is controlled based on a push amount of the piston 730 so that control accuracy may be improved and a noise may be reduced upon piston 730 position based operation control.

Meanwhile, when the change rate in operation rate of the compressor 112 is less than the predetermined value, the inverter controller calculates a current position of the piston 730 based on the stroke of the piston 730, and outputs a switching control signal based on a current position of a reference position of the piston 730 so that control accuracy may be improved and a noise may be reduced upon piston 730 position based operation control.

Meanwhile, FIG. 14a is a diagram illustrating that the stroke between Pa and Pb, which are spaced apart from the discharge end P2, is learned based on the detected Xv, which illustrates that an $X_{TDC\_a}$ calculation error is compensate by detecting a reference position Xv during increasing the stroke.

Next, FIG. 14b is a diagram that an absolute position is controlled based on the learned stroke value between Paa and Pab, which illustrates that an interval XTDC b between the discharge end P2 facing the discharge unit 746 and the piston 730 is less than a first preset value.

Meanwhile, the inverter controller 430 calculates the reference position of the piston 730 based on the output current. When the change rate in an operation rate of a compressor 112 is equal to or greater than a predetermined value, as shown in FIG. 15a, the inverter controller 430 may calculate a push amount of the piston 730 by fluid based on the stroke of the piston 730 and calculate the current position of the piston 730 based on the push amount to output a switching control signal Sic based on the current position and the reference position of the piston 730.

Meanwhile, the inverter controller 430 calculates the reference position of the piston 730 based on the output current. When the change rate in an operation rate of a compressor 112 is less than the predetermined value, as shown in FIG. 15b, the inverter controller 430 may calculate a current position of the piston 730 based on the push amount to output a switching control signal Sic based on the current position and the reference position of the piston 730.

Meanwhile, as shown in FIG. 15a, the inverter controller 430 may include a reference position calculator 925 for calculating a reference position of the piston 730 based on an output current; a stroke calculator 910 for calculating a stroke of the piston 730 based on the output current; a push amount calculator 915 for calculating a push amount of the piston 730 by fluid based on the stroke of the piston 730; a position calculator 930 for calculating a current position of the piston 730 based on a push amount when the change rate in an operation rate of the compressor 112 is equal to or greater than the predetermined value; and a switching control signal output unit 960 for outputting a switching control signal based on the current position and the reference position of the piston 730.

Meanwhile, as shown in FIG. 15b, the inverter controller 430 may include a reference position calculator 925 for calculating a reference position of the piston 730 based on an output current; a stroke calculator 910 for calculating a stroke of the piston 730 based on the output current; a position calculator 930 for calculating a current position of the piston 730 based on the stroke of the piston 730 when the change rate in an operation rate is less than the predetermined value; and a switching control signal output unit 960 for outputting a switching control signal based on the current position and the reference position of the piston 730.

The compressor driving apparatus and the refrigerator including the same according to the present invention are not limited to a configuration and a method of the above embodiments but all or some of the above embodiments may be selectively combined and configured so that variations and modifications can be made.

Meanwhile, the operation method of a refrigerator according to the present invention may be implemented by processor included in the refrigerator readable codes in a processor readable recording medium. The processor readable recording medium includes all types of storage devices for storing processor readable data. The processor readable recording medium includes ROM, RAM, CD-ROM, magnetic tape, floptical disk, optical data storage device. Further, the operation method of a refrigerator according to the present invention may be implemented by a carrier wave form such as transmission through Internet. In addition, the processor readable recording medium is distributed to a computer system connected through a network so that a processor readable code may be stored and executed in a distributed scheme.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The present invention is applicable to a compressor and a refrigerator including the same, more particularly, is applicable to a compressor capable of improving control accuracy and reducing a noise upon piston position based operation control, and a refrigerator including the same.

The invention claimed is:
1. A compressor driving apparatus comprising:
a compressor including a cylinder that has a discharge end for discharging fluid in the cylinder, a piston disposed in the cylinder and configured to perform a linear motion in a direction toward the discharge end, and a motor configured to drive the piston;
an inverter including a plurality of switches, the inverter being configured to convert direct current (DC) power into alternating current (AC) power and to output the converted AC power to the motor;

an output current detector configured to detect an output current flowing through the motor; and an inverter controller configured to control the inverter based on the output current, wherein the inverter controller is configured to:

control the inverter to fix an end of the piston at a first position spaced apart from the discharge end during a first period of a stroke of the piston, control the inverter to make a collision of the piston with the discharge end based on a change rate in an operation rate or a position error of the compressor being equal to or greater than a predetermined value, and control the inverter to fix the end of the piston at a second position spaced apart from the discharge end during a second period after the collision of the piston.

2. The compressor driving apparatus of claim 1, wherein the inverter controller is further configured to, based on the change rate in the operation rate or the position error of the compressor being less than the predetermined value, fix the piston at the first position to define an end of the stroke.

3. The compressor driving apparatus of claim 1, wherein the inverter controller is further configured to:

calculate a reference position of the piston based on the output current, calculate a push amount of the piston when the change rate in the operation rate of the compressor is equal to or greater than the predetermined value, the push amount of the piston representing a displacement of the piston pushed by the fluid based on the stroke of the piston, calculate a current position of the piston based on the push amount of the piston, and output a switching control signal based on the current position and the reference position of the piston.

4. The compressor driving apparatus of claim 3, wherein the inverter controller comprises:

a reference position calculator for calculating the reference position of the piston based on the output current;

a stroke calculator for calculating the stroke of the piston based on the output current;

a push amount calculator for calculating the push amount of the piston based on the stroke of the piston; and a position calculator for calculating the current position of the piston based on the push amount when the change rate in the operation rate of the compressor is equal to or greater than the predetermined value.

5. The compressor driving apparatus of claim 1, wherein the inverter controller is further configured to:

calculate a reference position of the piston based on the output current, calculate a current position of the piston based on the stroke of the piston when the change rate in the operation rate of the compressor is less than the predetermined value, and output a switching control signal based on the current position and the reference position of the piston.

6. The compressor driving apparatus of claim 5, wherein the inverter controller comprises:

a reference position calculator for calculating the reference position of the piston based on the output current;

a stroke calculator for calculating the stroke of the piston based on the output current; and a position calculator for calculating the current position of the piston based on the stroke of the piston when the change rate in the operation rate of the compressor is less than the predetermined value.

7. A refrigerator comprising the compressor driving apparatus according to claim 1.

8. A compressor driving apparatus comprising:

a compressor including a cylinder that has a discharge end for discharging fluid in the cylinder, a piston disposed in the cylinder and configured to perform a linear motion in a direction toward the discharge end, and a motor configured to drive the piston;

an inverter including a plurality of switches, the inverter being configured to convert direct current (DC) power into alternating current (AC) power and to output the converted AC power to the motor;

an output current detector configured to detect an output current flowing through the motor; and an inverter controller configured to control the inverter based on the output current, wherein the inverter controller is configured to:

calculate a reference position of the piston based on the output current, calculate a push amount of the piston based on a change rate in an operation rate of the compressor being equal to or greater than a predetermined value, the push amount of the piston representing a displacement of the piston pushed by the fluid based on a stroke of the piston, calculate a current position of the piston based on the push amount of the piston, and output a switching control signal based on the current position and the reference position of the piston.

9. The compressor driving apparatus of claim 8, wherein the inverter controller is configured to:

calculate the current position of the piston based on the stroke of the piston based on the change rate being less than the predetermined value.

10. The compressor driving apparatus of claim 9, wherein the inverter controller comprises:

a reference position calculator for calculating the reference position of the piston based on the output current;

a stroke calculator for calculating the stroke of the piston based on the output current; and a position calculator for calculating the current position of the piston based on the stroke of the piston when the change rate is less than the predetermined value.

11. The compressor driving apparatus of claim 8, wherein the inverter controller comprises:

a reference position calculator for calculating the reference position of the piston based on the output current;

a stroke calculator for calculating the stroke of the piston based on the output current;

a push amount calculator for calculating the push amount of the piston based on the stroke of the piston; and a position calculator for calculating the current position of the piston based on the push amount when the change rate is equal to or greater than the predetermined value.

12. The compressor driving apparatus of claim 8, wherein the inverter controller is further configured to:

control the inverter to fix an end of the piston at a first position spaced apart from the discharge end during a first period of the stroke of the piston, control the inverter to make a collision of the piston with the discharge end based on the change rate in the operation rate or a position error of the compressor being equal to or greater than the predetermined value, and control the inverter to fix the end of the piston at a second position spaced apart from the discharge end during a second period of the stroke of the piston after the collision of the piston.

13. A refrigerator comprising the compressor driving apparatus according to claim 8.

* * * * *